(12) United States Patent
Fleming et al.

(10) Patent No.: US 7,024,929 B2
(45) Date of Patent: Apr. 11, 2006

(54) FLOW STABILIZER FOR FLOW BENCH

(76) Inventors: Ronald J. Fleming, 3290 E. 48th St., Indianapolis, IN (US) 46205; August E. Fleming, 3290 E. 48th St., Indianapolis, IN (US) 46205

( * ) Notice: Subject to any disclaimer, the term of this patent is extended or adjusted under 35 U.S.C. 154(b) by 0 days.

(21) Appl. No.: 10/396,924

(22) Filed: Mar. 25, 2003

(65) Prior Publication Data

US 2006/0021427 A1    Feb. 2, 2006

Related U.S. Application Data

(60) Provisional application No. 60/426,960, filed on Nov. 15, 2002, provisional application No. 60/367,972, filed on Mar. 26, 2002, provisional application No. 60/367,182, filed on Mar. 25, 2002.

(51) Int. Cl.
G01M 9/02 (2006.01)
G01M 9/04 (2006.01)

(52) U.S. Cl. ..................................... 73/147

(58) Field of Classification Search ............... 73/147, 73/148, 170.01, 170.04, 170.06, 170.07, 73/170.08, 170.09, 170.11
See application file for complete search history.

(56) References Cited

U.S. PATENT DOCUMENTS

| | | | |
|---|---|---|---|
| 1,645,449 A | | 10/1927 | Proebstel |
| 1,811,364 A | * | 6/1931 | Olshevsky ............... 73/147 |
| 1,940,790 A | * | 12/1933 | Diehl ........................ 138/44 |
| 2,390,252 A | | 12/1945 | Hayward |
| 2,448,966 A | * | 9/1948 | Fales ........................ 73/147 |
| 2,603,695 A | * | 7/1952 | Campbell ............... 340/966 |
| 2,714,819 A | | 8/1955 | Clark |
| 2,788,661 A | * | 4/1957 | Post et al. ................ 73/147 |
| 2,790,320 A | | 4/1957 | Salko et al. |
| 2,914,941 A | * | 12/1959 | Frenzl ...................... 73/147 |
| 3,020,754 A | * | 2/1962 | Swanson ................... 73/147 |
| 3,055,212 A | * | 9/1962 | Mackey ..................... 73/147 |
| 3,111,842 A | * | 11/1963 | Fredette et al. .......... 73/147 |
| 3,111,843 A | * | 11/1963 | Fredette ................... 73/147 |
| 3,403,277 A | * | 9/1968 | Way et al. ................ 313/35 |
| 3,484,953 A | * | 12/1969 | Norheim, Jr. ........... 434/258 |
| 3,552,202 A | * | 1/1971 | Kroeger et al. .......... 73/147 |

(Continued)

FOREIGN PATENT DOCUMENTS

JP    60098331 A    6/1985

(Continued)

OTHER PUBLICATIONS

Bereketab, Semere, "Complex Equilibrium of Laterally Curved Wakes", Oct. 25, 1999, pp. 16-17.*

(Continued)

*Primary Examiner*—Hezron Williams
*Assistant Examiner*—David Rogers
(74) *Attorney, Agent, or Firm*—Woodard, Emhardt, Moriarty, McNett & Henry LLP

(57) ABSTRACT

Apparatus and methods for airflow testing, especially for air testing of gas turbine components on an airflow test bench. Various embodiments of the present invention include the use of a flow-stabilizing member downstream of the component being tested. Since the flow through or over the component is subsonic, a flow-stabilizing member placed down stream of the component can have an effect on the flow conditions in or around the component being tested. In one embodiment, the flow-stabilizing member provides more consistent results during the testing of the component.

36 Claims, 7 Drawing Sheets

U.S. PATENT DOCUMENTS

| | | | |
|---|---|---|---|
| 3,578,264 A | | 5/1971 | Kuethe |
| 3,770,227 A | * | 11/1973 | Von Ohain et al. .......... 244/207 |
| 3,782,189 A | * | 1/1974 | Evans .......................... 73/147 |
| 3,817,082 A | * | 6/1974 | Fletcher et al. ............... 73/1.21 |
| 3,866,466 A | * | 2/1975 | Cotter .......................... 73/147 |
| 3,875,955 A | | 4/1975 | Gallatin et al. |
| 3,931,734 A | * | 1/1976 | Dereng ........................ 73/147 |
| 3,952,590 A | * | 4/1976 | Howard et al. ............... 73/147 |
| 3,975,955 A | * | 8/1976 | Dougherty et al. ........... 73/147 |
| 4,063,449 A | | 12/1977 | Griggs |
| 4,107,986 A | | 8/1978 | Jones |
| 4,213,327 A | | 7/1980 | Prescott, Jr. et al. |
| 4,344,330 A | | 8/1982 | Renken et al. |
| 4,372,157 A | | 2/1983 | Caruthers et al. |
| 4,422,333 A | | 12/1983 | Leon |
| 4,475,385 A | | 10/1984 | Farmer |
| 4,534,216 A | * | 8/1985 | Fasano et al. ................ 73/147 |
| 4,602,514 A | | 7/1986 | Kurrie et al. |
| 4,770,031 A | * | 9/1988 | Roth et al. .................... 73/147 |
| 4,799,511 A | | 1/1989 | Azimov |
| 4,812,050 A | | 3/1989 | Epstein et al. |
| 4,912,973 A | | 4/1990 | Milewski et al. |
| 5,020,364 A | | 6/1991 | Manitt et al. |
| 5,035,359 A | * | 7/1991 | Yamada et al. ............. 239/502 |
| 5,056,361 A | | 10/1991 | Roberts |
| 5,117,687 A | | 6/1992 | Gerardi |
| 5,136,881 A | | 8/1992 | Kendall, Jr. |
| 5,178,003 A | | 1/1993 | Wesorick |
| 5,187,937 A | | 2/1993 | Stevens et al. |
| 5,195,046 A | | 3/1993 | Gerardi et al. |
| 5,238,030 A | | 8/1993 | Miller et al. |
| 5,259,424 A | | 11/1993 | Miller et al. |
| 5,341,676 A | | 8/1994 | Gouterman et al. |
| 5,405,106 A | * | 4/1995 | Chintamani et al. ....... 244/23 D |
| 5,435,175 A | * | 7/1995 | Kramer et al. ................ 73/147 |
| 5,479,818 A | | 1/1996 | Walter et al. |
| 5,481,925 A | | 1/1996 | Woodbury |
| 5,495,754 A | * | 3/1996 | Starr et al. .................... 73/147 |
| 5,501,101 A | * | 3/1996 | Purcell ......................... 73/147 |
| 5,541,857 A | | 7/1996 | Walter et al. |
| 5,557,050 A | | 9/1996 | Campain et al. |
| 5,575,616 A | | 11/1996 | Hagle et al. |
| 5,594,665 A | | 1/1997 | Walter et al. |
| 5,689,066 A | | 11/1997 | Stevenson |
| 5,895,857 A | | 4/1999 | Robinson et al. |
| 5,913,249 A | | 6/1999 | Weckstrom |
| 5,942,678 A | | 8/1999 | Wettstein |
| 5,942,690 A | | 8/1999 | Shvetsky |
| 6,032,545 A | | 3/2000 | Carpenter et al. |
| 6,148,677 A | | 11/2000 | Evangelista |
| 6,155,111 A | * | 12/2000 | Wickern et al. ............... 73/147 |
| 6,189,390 B1 | | 2/2001 | Platt |
| 6,230,103 B1 | | 5/2001 | DeCorso et al. |
| 6,237,426 B1 | | 5/2001 | Gryc et al. |
| 6,378,361 B1 | * | 4/2002 | Larsen et al. ................. 73/147 |
| 6,411,102 B1 | | 6/2002 | Gilliland |
| 6,470,740 B1 | * | 10/2002 | Li ................................ 73/147 |
| 6,487,918 B1 | | 12/2002 | DeAngelis |
| 6,601,460 B1 | * | 8/2003 | Materna .................. 73/861.52 |
| 6,694,808 B1 | * | 2/2004 | Sawada et al. ............... 73/147 |
| 2002/0106451 A1 | | 8/2002 | May et al. |
| 2002/0112535 A1 | | 8/2002 | Guillet et al. |
| 2003/0070479 A1 | * | 4/2003 | Lacey, Jr. ..................... 73/147 |
| 2003/0089167 A1 | * | 5/2003 | Markstaller et al. .......... 73/147 |

FOREIGN PATENT DOCUMENTS

| | | | |
|---|---|---|---|
| JP | 04120434 A | | 4/1992 |
| JP | 08054313 A | * | 2/1996 |
| SU | 569890 A | | 10/1977 |
| SU | 1791713 A1 | | 1/1993 |
| WO | WO 95/32405 A1 | | 11/1995 |
| WO | WO 01/06216 A1 | | 1/2001 |

OTHER PUBLICATIONS

"P-3C Service Life Assessment Program Statement of Work", Oct. 28, 1998, pp. 15-16.*

Bertin et al., "Aerodynamics for Engineers", 1979, Prentice-Hall, Inc., pp. 54-63, 76-94, 378, 386, 387 390,391.*

"Air Flow Bench" to ALKAAD—GUNT, available on the Internet at <http://www.post1.com/home/alkaad/airflow.html>.*

"P3200 Air Flow Bench Experiments" Cussons Technology, available on the Internet at <http://www.cussons.co.uk>.*

"The Wind Tunnel" to Filippone, available on the Internet at <http://aerodyn.org/WindTunnel/ttunnels.html>.*

"Open Loop vc. Closed Loop" to the Franklin Institute, available on the Internet at <http://www.fi.edu/flights/first/tunnelparts/tunnel_loop.html>.*

"VKI Turbomachinery and Propulsion Department Test Facilities" to the von Karman Institute, 2003.*

"Research Activities 98-99: Flow in Turbomachines" to the von Karman Institute, 1999.*

Von Karman Institute, "Test Facllitias and Technical Support", 2003, pp. 8, 34, 38, 39, 42-44, http://www.vki.ac.be.

* cited by examiner

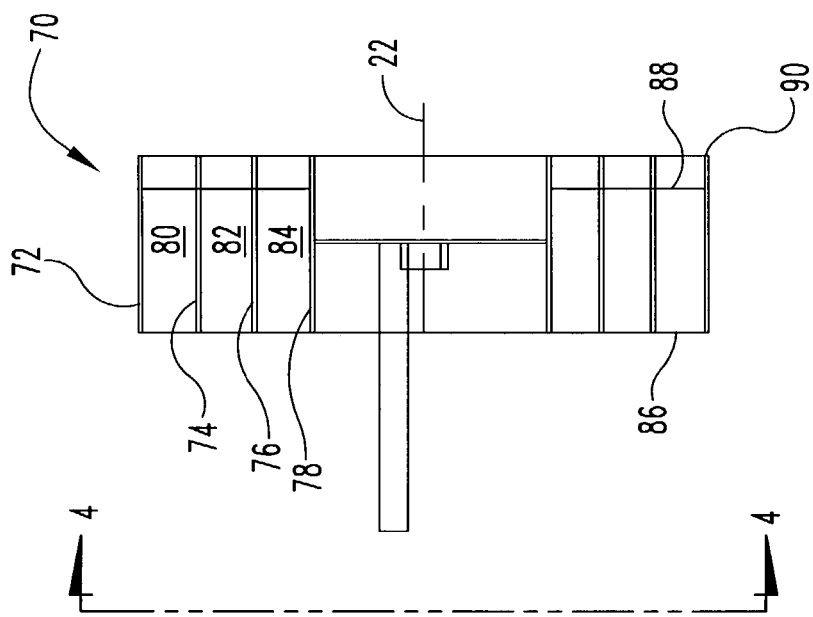
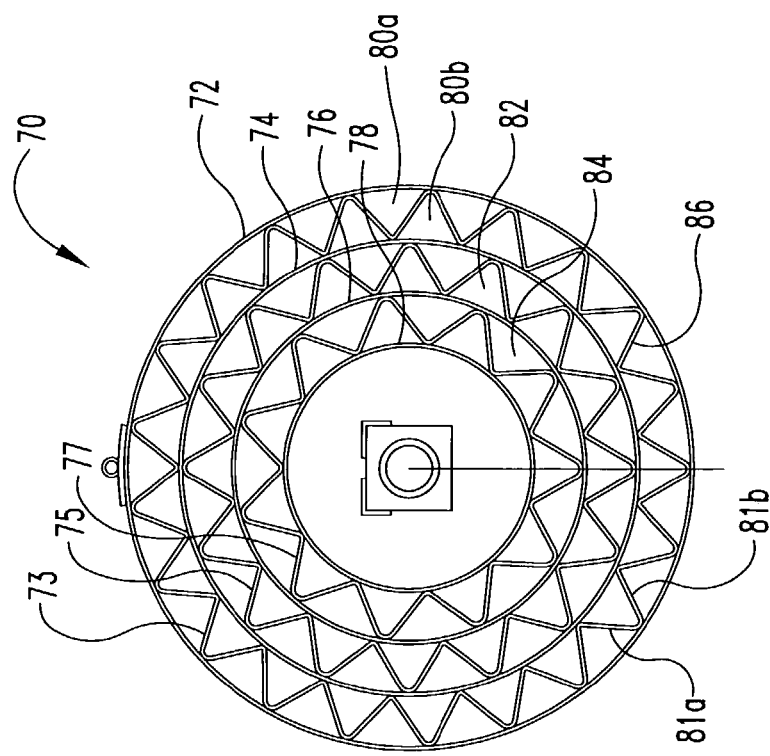

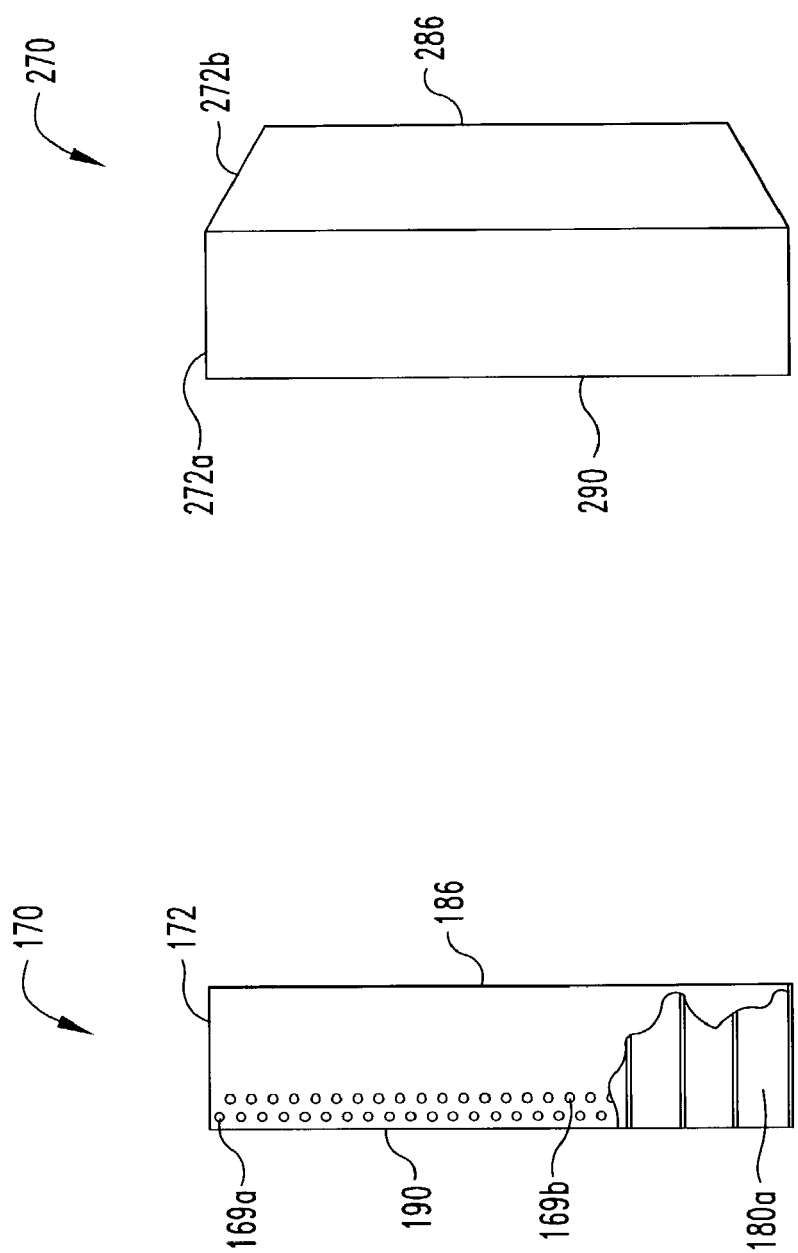

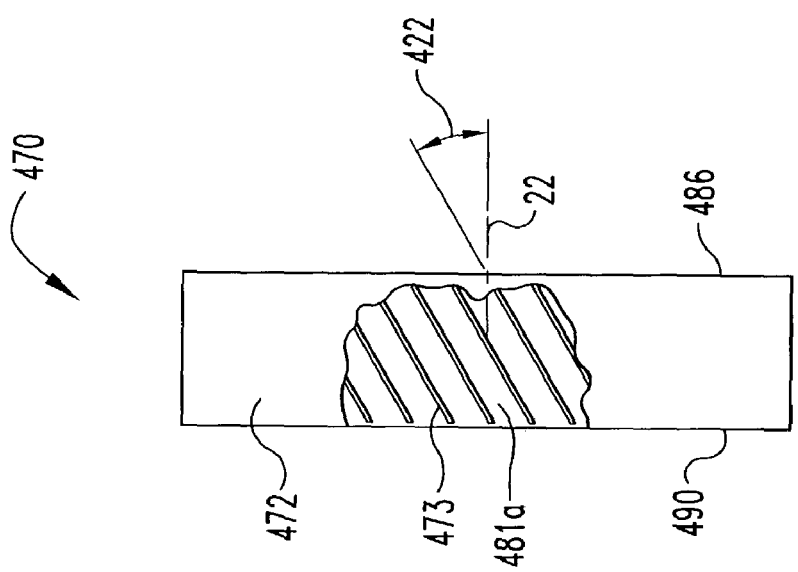
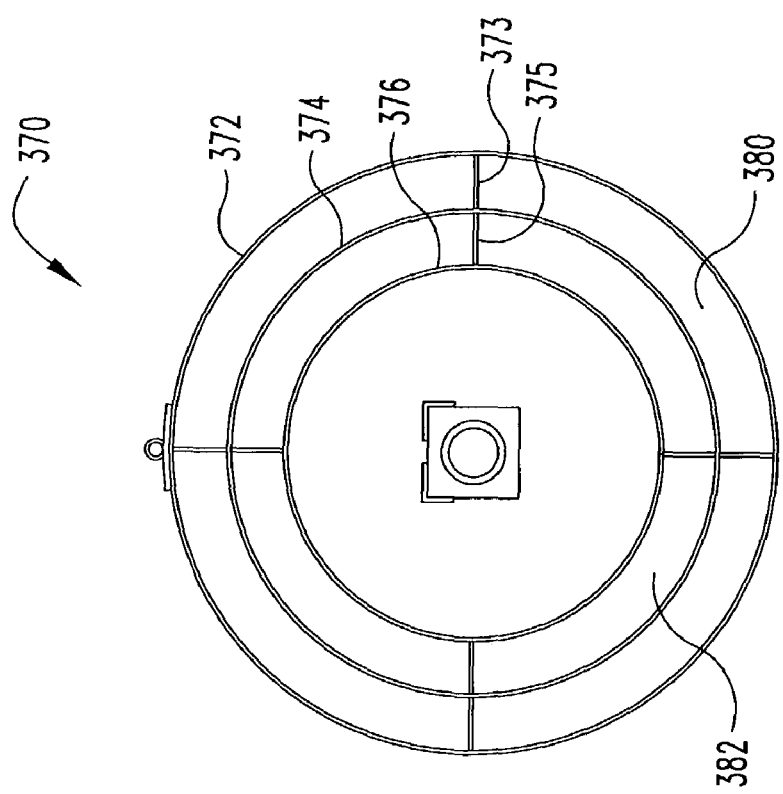
Fig. 8
Fig. 7

FLOW STABILIZER FOR FLOW BENCH

CROSS REFERENCE TO RELATED APPLICATIONS

The present invention claims the benefit of priority to U.S. Provisional Patent Application Ser. No. 60/367,182, filed Mar. 25, 2002; U.S. Provisional Patent Application Ser. No. 60/367,972, filed Mar. 26, 2002; and U.S. Provisional Patent Application Ser. No. 60/426,960, filed Nov. 15, 2002, all of which are incorporated herein by reference.

FIELD OF THE INVENTION

The present invention relates to improved apparatus and methods for airflow testing, and more particularly to measurement of airflow characteristics of a gaspath component of a gas turbine engine.

BACKGROUND OF THE INVENTION

Devices such as natural gas compressors, air compressors, steam turbines, and gas turbines, include various internal components, such as vanes, stators, blades, diffusers, housings, and combustors though which quantities of air, natural gas, steam, or combusted gas flow. It is important to the proper operation of these devices that these internal components modify the internal flow in the correct way. These modifications include changing the average properties of the flowing medium (such as pressure, temperature, density, velocity, etc.) and/or the profiles and gradients of these properties.

These internal components are designed to change the properties of the flowing medium within the context of the device, i.e., change the properties in respect to internal devices either upstream or downstream of the particular component. For example, the first stage turbine vane of a gas turbine engine receives combusted air from a combustor and provides the combusted air to turbine blades located downstream. Even though these internal components are designed to interact with upstream and downstream components during operation of the device, it is often not possible or too difficult and expensive to measure characteristics of the internal component during operation of the device. Therefore, it is important to be able to measure characteristics of the device prior to assembling the component within the device. For example, vanes of gas turbine engine are often flow tested during the manufacturing process and prior to assembly. This manufacturing phase flow test is often used to determine whether or not the particular internal component will be assembled and tested within the larger overall device.

These manufacturing airflow tests sometimes produce results that are not representative of the operation of the particular internal component within the assembled device. In particular, the inferred flow characteristic of the component (such as the equivalent flow area of the gas turbine vane) is affected by uncontrolled aspects of the manufacturing tests. These uncontrolled aspects cause the value of the inferred characteristic to be erratic or wrong.

What is needed is an improvement in airflow testing that improves the accuracy and repeatability of the airflow tests. The present invention does this in a novel and nonobvious manner.

SUMMARY OF THE INVENTION

The present invention relates to various apparatus and methods for airflow testing of a component of a gas turbine engine.

In one embodiment of the present invention, the apparatus includes a test bench and a flow directing member. The test bench includes a source of flowing gas, and is adapted and configured to mount a component to be tested. The flow directing member is located downstream of the component, and receives gas that has flowed through the component. The flow directing member includes a plurality of internal passageways for directing the flow of gas through the flow directing member.

In another embodiment, the apparatus includes a test bench, means for directing gas into a component and means for directing gas exiting the component. The test bench includes a source of flowing gas and a housing adapted and configured for mounting the component. The apparatus further includes means for directing the source gas toward the component, and means for directing gas exiting the component. In some embodiments, the apparatus further includes an instrument for measuring a property of the flowing gas. Yet other embodiments include a display for receiving a signal from the instrument and providing an indication to an operator about the property of the flowing gas.

Yet another embodiment of the present invention concerns a method for evaluating a component of a gas turbine engine. The method further includes mounting the component to a plenum chamber, directing a flow of the gas into the plenum chamber, flowing the gas through the component, flowing the gas exiting the component into a gas flow directing member, and modifying the flow of gas through the component by the flow of gas through the gas flow directing member.

Yet other aspects of the present invention will be apparent from the description of the preferred embodiment, the drawings, and the claims to follow.

DESCRIPTION OF THE DRAWINGS

FIG. 3 is a side elevational view of an apparatus according to one embodiment of the present invention.

FIG. 4 is an end elevational view of the apparatus of FIG. 3 as taken along line 4—4 of FIG. 3.

FIG. 5 is a side elevational view of an apparatus according to another embodiment of the present invention.

FIG. 6 is a side elevational view of an apparatus according to another embodiment of the present invention.

FIG. 7 is an end elevational view of an apparatus according to another embodiment of the present invention.

FIG. 8 is a side elevational view of an apparatus according to another embodiment of the present invention.

DESCRIPTION OF THE PREFERRED EMBODIMENT

Figure 1:
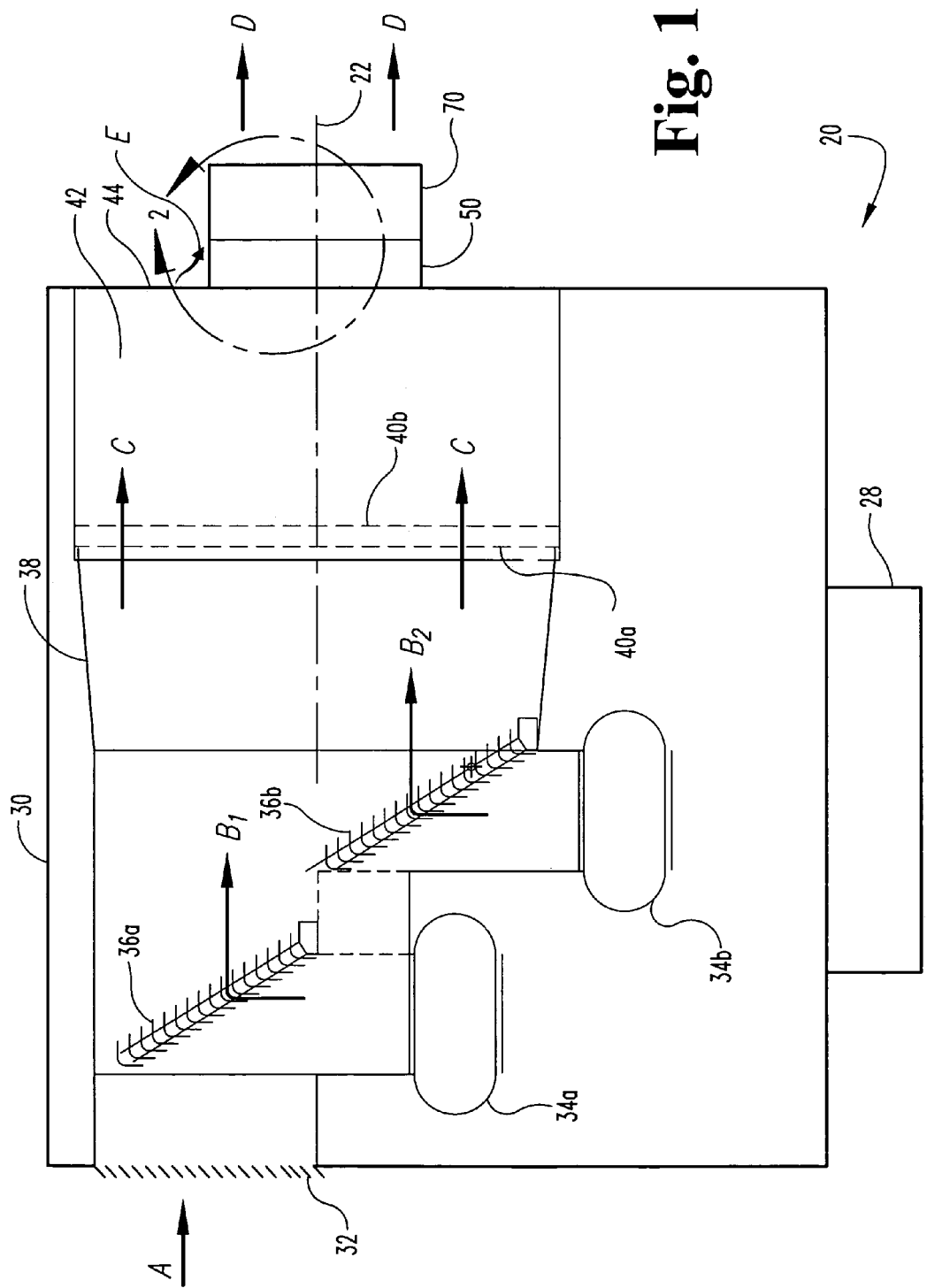
FIG. 1 is a schematic representation of an airflow measurement system according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to improved apparatus and methods for measurement of airflow through a component, such as a vane or other gaspath component of a gas turbine engine. In one embodiment, the present invention includes various devices and methods for directing air into the component to be tested, and also various devices and methods for directing the flow of air exiting from the tested component.

In one embodiment, the present invention uses one or more air blowers to act as a source of air into a plenum chamber. Preferably, there are a plurality of devices for directing the path of the air, such as turning vanes, that accept air from the source and provide it in a predetermined pattern to a plenum. In some embodiments, the entrance to the plenum chamber may include another flow manipulation device such as one or more sheets of perforated metal. Attached at one end of the plenum chamber and preferably along a centerline of the chamber, is a component such as an engine component for which it is desired to measure the airflow characteristics. Air flowing from the source through the vanes and perforated metal into the plenum chamber is presented to the inlet of the component in a predetermined flow pattern. Air flows from the plenum chamber through the tested component and into another flow directing member. The flow directing member includes a plurality of flow directing devices, such as concentric rings, flow-through cells and the like, and finally into room ambient conditions. By controlling the conditions of the test, such as the speed of the air blowers, the airflow provided to the main plenum, the pressure and temperature of the air in the main plenum, various flow characteristics of the test component can be determined.

The present invention includes the discovery that placement of a flow directing or stabilizing member proximate to the exit of the tested component improves the accuracy, reliability, and repeatability of the measurements that pertain to the test component. Although the phenomenon may not be completely understood, it is believed that this improvement is due, at least in part, to the stabilization of air flowing over the tested component along with a reduction in the recirculation of air exiting the tested component.

FIG. 1 schematically represents a system 20 for airflow testing of a component. System 20 includes a test bench 30 which includes an electronic controller 28 for control of test bench 30 as well as measurement of various parameters. Located along centerline 22 of test bench 30 are a test assembly 50 and an exit flow-stabilizing member 70. As will be explained, air flows generally from ambient conditions as indicated by arrow A into test bench 30. This air is directed and combined with other sources of air as indicated by arrows B1 and B2. In one embodiment of the present invention, the air is further manipulated and provided in a predetermined airflow pattern C. The air C flows through the test assembly and flow stabilizing member back into ambient conditions as indicated by arrows D.

In one embodiment, test bench 30 includes an air inlet 32 for providing ambient air into a flow path of the test chamber. This incoming air, indicated by arrow A, mixes with air provided form a source of air which preferably includes multiple air blowers 34a and 34b. Air blowers 34a and 34b provide air into turning vanes 36a and 36b, respectively, which direct air from these sources toward the component to be tested. Airflow B1 and airflow B2 are provided in one embodiment to a transition duct 38 which changes its cross-sectional shape from square to round. Air exiting the round opening of duct 38 preferably flows through a plurality of perforated metal screens 40a and 40b into a round plenum chamber 42. Air flowing into chamber 42 flows in a predetermined pattern chosen to provide accurate and repeatable testing of testing assembly 50.

Figure 2:
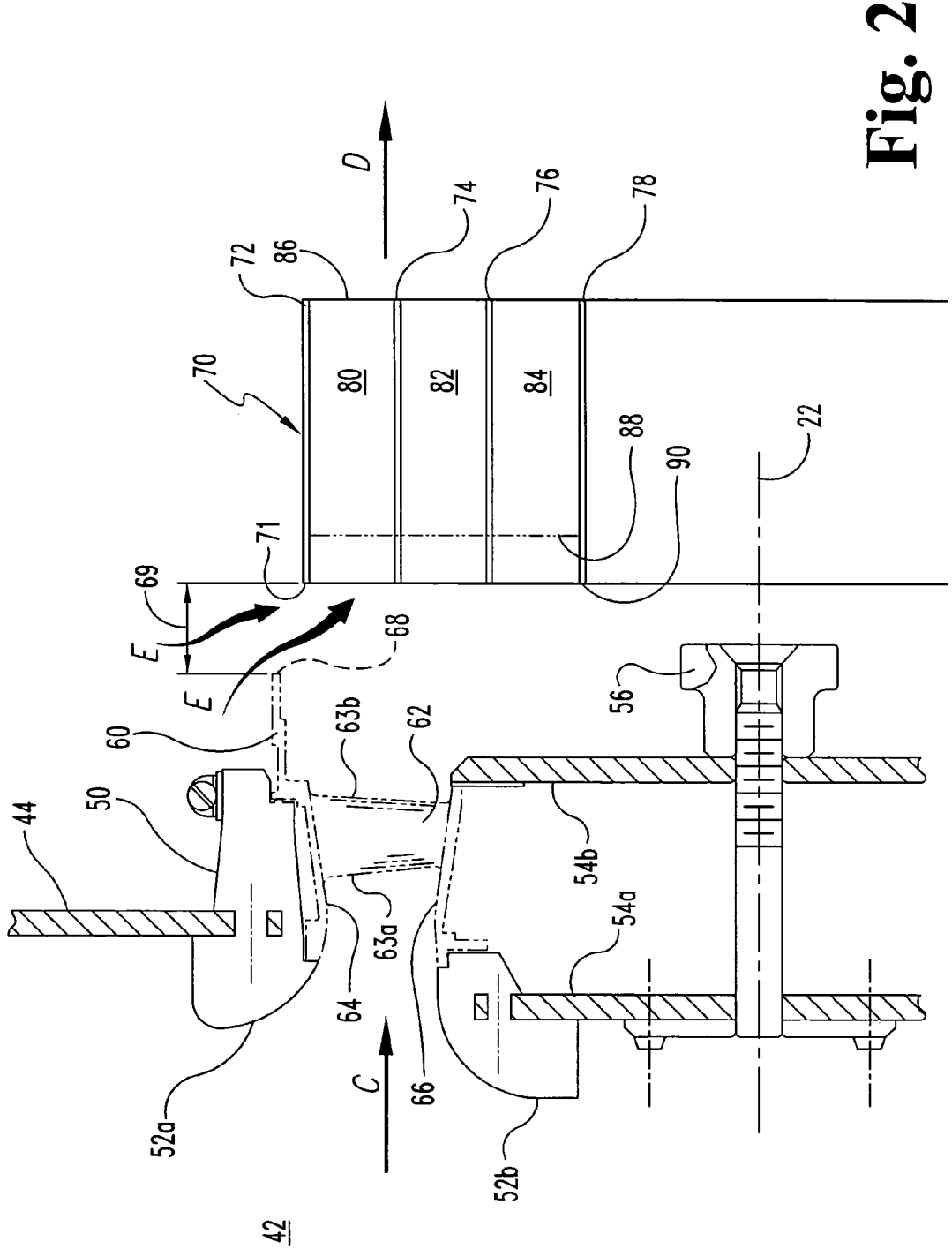
FIG. 2 is a partial cutaway view of a portion of the apparatus of FIG. 1.

Referring to FIGS. 1 and 2, testing assembly 50 includes one or more components 60, such as one or more vanes or other air foil shapes from a gas turbine engine. However, the present invention contemplates the air flow testing of any device which is adapted and configured to provide predetermined flow characteristics such as a particular air flow at a particular component pressure drop.

Testing assembly 50 is preferably coupled to an end 44 of chamber 42. As best seen in FIG. 2, test assembly 50 includes upper and lower flow path transition pieces 52a and 52b, respectively, which are mounted along the upper and lower gas path walls 64 and 66, respectively, of component 60 upper and lower flow path pieces 52a and 52b provide smooth and predetermined characteristics for airflow C provided from plenum 42. In some embodiments, transitions pieces 52a and 52b simulate the shape and/or characteristics of other gaspath components of the gas turbine engine that are proximate to component 60.

Component 60 is mounted in compression between a pair of coupling plates 54a and 54b. A screw assembly 56 maintains plates 54a and 54b in compression against leading and trailing edges of component 60. A compression member (not shown) clamps a testing assembly 50 to end 44 of plenum chamber 42 along centerline 22.

As best seen in FIG. 2, a flow-stabilizing member 70 is located proximate to the aft end 68 of component 60. In some embodiments of the present invention, there is a gap 69 between the forward most edge 71 of member 70 and the aft most edge 68 of component 60. In some embodiments of the present invention and under certain flow conditions, it has been found that having a gap 69 of about one inch provides good repeatability of the measurements of the airflow characteristics of component 60. With the gap 69 present, airflow through the component will entrain ambient air prior to entering the flow-stabilizing member 30. The additional entrained air is shown by arrows E. However, the present invention also contemplates those embodiments in which there is no gap 69, and air flowing along the upper surface of component 60 exits directly into flow stabilizing member 70.

Referring to FIGS. 2, 3, and 4, one embodiment of the present invention includes a flow stabilizing member 70 which includes a plurality of concentric rings 72, 74, 76, and 78. In one embodiment of the present invention, the radial distance between adjacent rings is approximately equal. However, the present invention contemplates any spacing between adjacent rings.

As best seen in FIG. 4, located between adjacent rings are convoluted members 73, 75, and 77. As one example, convoluted member 73 includes a plurality of folded sections 81a and 81b in a "saw tooth" pattern. Convoluted member 73 is formed into a round shape, and inserted between rings 72 and 74. Likewise, convoluted members 75 and 77 are inserted between respective rings. The folds 81a and 81b of member 73 form a plurality of cells 80a and 80b between rings 72 and 74. In one embodiment of the present invention, each cell includes three substantially parallel walls that direct airflow therethrough in a predetermined pattern. For example, a cell 80a is formed between a wall 81a, a wall 81b, and a portion of ring 72, which provide a flow-through passageway for air exiting the tested component 60. Likewise, an alternate cell 80b is formed between a wall 81a, a wall 81b, and a portion of ring 74, which also provide a flow-through passageway for air exiting the tested component 60. Therefore, air exiting test component 60 flows through a plurality of three-sided cells. It is believed that the airflow straightening provided by these cells provides a stabilizing influence upstream to component 60, such as to either the pressure side or suction side of the air foil of vane 62, anywhere from its leading edge 63a to its trailing edge 63b. Referring to FIG. 2, air exiting component 60 can flow into any of a plurality of cells 80, 82, or 84. Note that as flow stabilizing member 70 is brought closer to component 60 (such that gap 69 diminishes), less air is carried through cells 84 between rings 76 and 78. Although what has been shown and described is a three-sided cell where the three cell walls are parallel, the present invention contemplates other configurations of multi-walled cells, including, as non-limiting examples, square and hexagonal honeycomb cells.

Referring to FIGS. 2 and 3, an arrangement of cells and rings according to one embodiment of the present invention can be seen. Rings 72, 74, 76, and 78 preferably have leading edges 90, which lie in a common plane. Convoluted members 73, 75, and 77 have a leading edge 88 that preferably lie in a common plane. The leading edge 88 of the convoluted members, and therefore also the leading edge of the cells, is preferably spaced aft of the leading edge 90 of the rings by about one-half inch. Further, the trailing edges of the convoluted edges and also the trailing edges of the concentric rings lie in a common plane 86. However, the present invention also contemplates those embodiments in which none of the trailing edges of cells 80, 82, or 84 lie in a common plane, nor do the trailing edges of the retaining rings 72, 74, 76 or 78. Further, the present invention also contemplates those embodiments in which the various leading edges of the rings and convoluted members are not offset from one another. Additionally, the present invention contemplates those embodiments in which none of the leading edges of the concentric or the convoluted members share a common plane.

FIGS. 5–11 depict various apparatus according to other embodiments of the present invention. The use of an N-prefixed element number (NXX) refers to an element that is the same as the non-prefixed element number (XX), except for the changes or modifications shown or described thereafter.

FIG. 5 is side elevational view of a flow-stabilizing member 170 according to another embodiment of the present invention. Flow-stabilizing member 170 incorporates an outermost concentric ring 172 which preferably surrounds a plurality of internal cells 180a. Ring 172 also includes at least one aperture 169a which permits flow of air therethrough. For example, if an aperture 169a is placed over a cell 180a which has a static pressure higher than ambient, air from within cell 180a will flow outward through aperture 169a into ambient. Further, if the static pressure within cell 180a is lower than ambient pressure, then air will be entrained from ambient conditions through aperture 169a and into the cell. Preferably, ring 172 includes a plurality of apertures 169a located around the circumference of the ring. Other embodiments of the present invention can include a second row of apertures 169b, as well as additional rows (not shown). Further, other embodiments of the present invention incorporate one or more apertures in the outer ring of the flow stabilizing member in an asymmetric pattern, such as over only a few individual cells. In some applications of the present invention, flow-stabilizing member 170 is brought into contact with component 60 or otherwise sealed to the aft end of component 60 such that there is little or no gap 69 for entrainment. In these applications, the entrainment of air is through one or more of the apertures 169.

FIG. 6 is a side elevational view of a flow-stabilizing member 270 according to another embodiment of the present invention. Flow-stabilizing member 270 includes a first outermost concentric ring 272a which is generally cylindrical. Coupled to one end of ring 272a is a second external ring 272b which converges in cross sectional area along the flow path. Thus, flow-stabilizing member 270 comprises a converging nozzle. In some embodiments, flow-stabilizing member 270 has a generally open interior. In yet other embodiments, the interior of member 270 comprises a plurality of open cells, similar to those shown in FIG. 4 or 7. Further, yet other embodiments of the present invention include additional internal rings 274a and 274b which comprise boundaries of the interior of the flow path.

FIG. 7 depicts an end elevational view of a flow-stabilizing member 370 according to another embodiment of the present invention. Member 370 includes a plurality of concentric rings defining a plurality of flow-through open cells. In one embodiment, flow-stabilizing member 370 includes three concentric rings 372, 374, and 376. These rings are spaced apart by a plurality of spacing members 373 and 375. Outermost ring 372 and intermediate ring 374 define an annulus therebetween. The annulus being subdivided into four cells 370. Intermediate ring 374 and innermost ring 376 define a second, smaller annulus, which is subdivided into a plurality of open flow-through cells 382. In one embodiment, each ring 372, 374, and 376 are concentric and cylindrical. However, the present invention also contemplates those embodiments in which the rings are adapted and configured to define flow-through cells 380 and 382 which either converge in flow area in the direction of the flow path, or converge in flow area along the direction of the flow path. For example, each cell 380 in the outermost annulus can have a converging cross section, such that the gas flow into the outer annulus is received in a converging nozzle. Further, this embodiment could be combined with a plurality of innermost cells 382 which include diverging cross sectional areas, such that gas exiting the component flows into the diverging nozzle.

FIG. 8 is a side elevational view of a flow-stabilizing member 470 shown in partial cutaway. Convoluted internal member 473 is adapted and configured such that one or more cells 481a direct gas received at the leading edge 490 along an angle 422 relative to centerline 22. In some embodiments, the component 60 being tested may impart swirl to the gas flowing through it. In some embodiments of the present invention, it is advantageous to align the cells 481 to a predetermined angle which corresponds to the angle of swirl, such as by setting the various convoluted members at an angle 422. The present invention contemplates those embodiments in which angle 422 is chosen to be parallel or non-parallel to the swirl angle for gas exiting from component 60.

Figure 10:
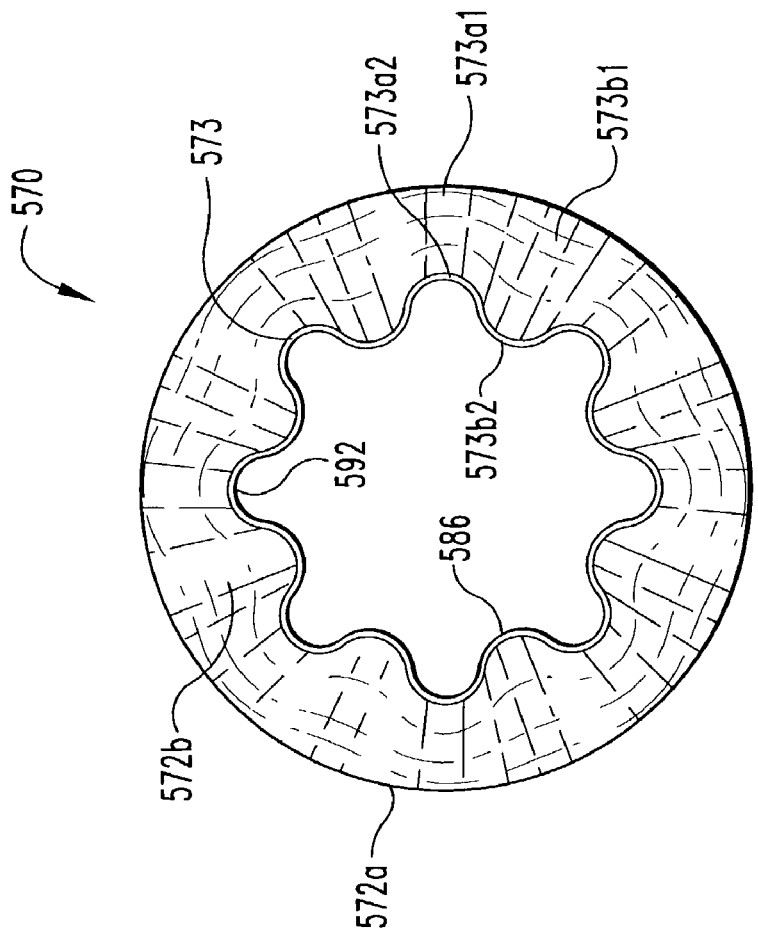
FIG. 10 is an end elevational view of the apparatus of FIG. 9 as taken along line 10—10 of FIG. 9.
Figure 9:
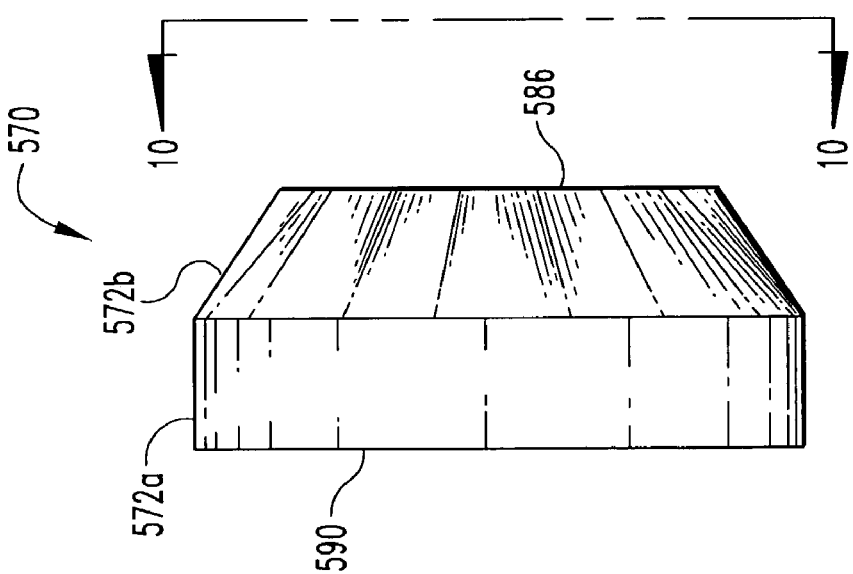
FIG. 9 is a side elevational view of an apparatus according to another embodiment of the present invention.

FIGS. 9 and 10 depict side elevational and end elevational views of a flow-stabilizing member 570 according to another embodiment of the present invention. In one embodiment, member 570 includes a first section of approximately constant cross sectional flow area within the interior of cylindrical ring 572a. A second, converging cross sectional flow area portion follows after the cylindrical portion, and is contained within a generally converging downstream portion 572b. Converging outer ring portion 572b includes a plurality of preferably rounded, axially-directed external convolutions 573. Outer ring portion 572b includes an alternating pattern of outwardly drawn convolutions 573a and inwardly drawn convolutions 573b.

Referring to FIG. 10, the aftmost common plane 586 at the exit of convolutions 573 include a series of alternating large diameter convolutions 573a2 and smaller diameter convolutions 573b2. As one example, FIG. 10 shows a flow-stabilizing member 570 having eight larger-diameter rounded convolutions 573a2 arranged in an alternating pattern with eight smaller diameter rounded convolutions 573b2. In one embodiment, the deepness of convolutions 573 (i.e., the difference in diameter between the larger diameter convolutions 573a2 and the smaller diameter convolutions 573b2 at a particular axial location) changes in the axial direction along centerline 22. There is less deepness or difference between the larger and smaller diameter convolutions at the fowardmost portion ring of 572b, and more deepness or difference between the larger and smaller diameter convolutions at the aftmost common plain 586. Referring to FIG. 10, the smaller diameter convolutions 573a1 are less deeply drawn than aftmost convolutions 573a2. Likewise, the smaller diameter convolutions 573b1 are less deeply drawn than aftmost convolutions 573b2. Preferably, the convolutions blend gently into forwardmost ring portion 572a.

Figure 11:
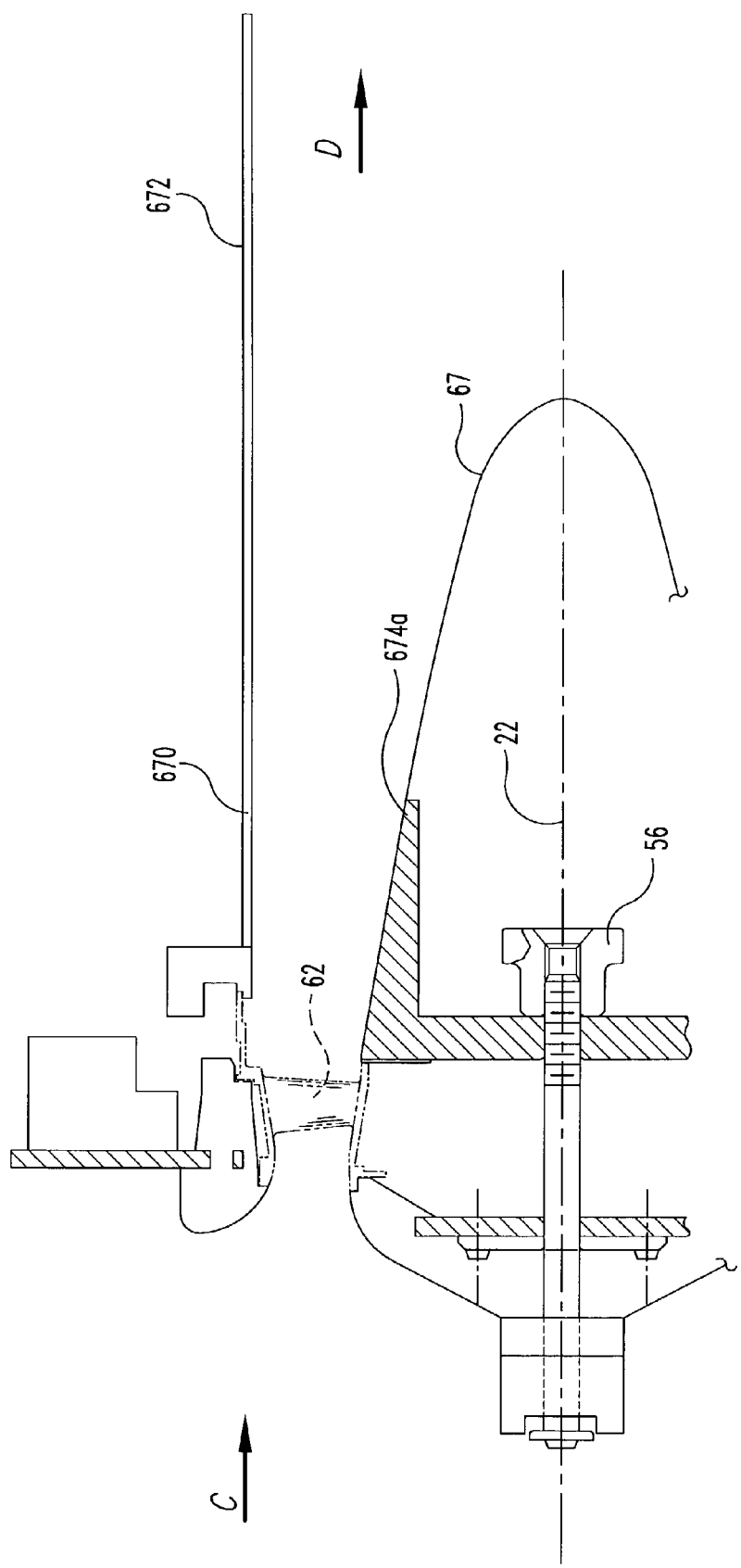
FIG. 11 is a partial cutaway view of a portion of an apparatus according to another embodiment of the present invention.

FIG. 11 depicts a partial cross sectional view of an apparatus including a flow-stabilizing member 670, in a view that is analogous to the view of FIG. 2. Flow-stabilizing member 670 includes a generally cylindrical outer concentric ring 672a, which forms an outer boundary for the flowpath. The inner boundary of the flowpath includes an inwardly-angled conically shaped member 674a. The portion of flow path between members 672 and 674a is generally diverging. Some embodiments of the present invention also include a tailcone 674b to provide a smooth inner boundary for the flow path.

In one embodiment of the present invention, there is an apparatus for airflow testing of a component. The apparatus includes a test bench including a source of air, a plenum, and at least one member for directing air from the source into said plenum. The apparatus includes a component receiving air from the plenum, the air flowing through the component. As the air flows through the component, interaction between the air and the component modifies the properties of the air, such as the velocity profile, the pressure profile, or the temperature of the air. The apparatus includes a flow stabilizing member located proximate to the component and receiving air from the component, the flow stabilizing member including a plurality of open cells, each cell having a plurality of parallel walls for passage of a portion of the air from the plenum therebetween. As the air exhausted from the component flows within the flow stabilizing member, one or more properties of the air, such as the velocity, pressure, or temperature are modified by the flow stabilizing member. Since the flow through the component and the flow stabilizing member is substantially subsonic, any modification of the air flowing through the flow stabilizing member is communicated upstream to the air flowing through the component. This effect is aided by close physical spacing of the component and the flow stabilizing member.

In another embodiment of the present invention, there is an apparatus with a source of air. The apparatus includes a component adapted and configured for redirection of air passing therethrough. The apparatus includes a means for directing air from the source to the component and means for redirecting air received from the component, the redirecting means including a plurality of multiwalled, flow-through passages for receiving and redirecting air exiting from the component.

In still another embodiment of the present invention, there is a method for testing the airflow characteristics of a gaspath component for a gas turbine engine. The method includes providing a source of air, a plenum chamber with two ends, a gas turbine gaspath component to be tested, and a plurality of cells defining flow-through passageways. The method includes directing the air from the source into one end of the plenum chamber, mounting the component at another end of the chamber, flowing the air through the chamber to the component, flowing the air through the component, and directing the air exiting the component through the passageways.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for flow testing of gas through a component having an internal gaspath, comprising:
   a test bench including a source of flowing gas and a housing defining a plenum chamber and an aperture for flowing of the gas into the internal gaspath of the component, said housing being adapted and configured to mount the component proximate to the aperture;
   a flow directing member located downstream of and proximate to the aperture, said flow directing member receiving gas from the internal gaspath of the component and exhausting the gas to about ambient conditions, said flow directing member including a plurality of open cells, each said cell having a plurality of walls for passage therebetween of a portion of the gas from the component;
   an instrument which measures a property of the gas; and
   wherein said housing is adapted and configured such that the internal gaspath of the component receives essentially all the gas flowing through the aperture, and said flow directing member and component define a gap therebetween such that gas exiting from the component entrains ambient air through the gap prior to entering the flow directing member.

2. The apparatus of claim 1 wherein said flow directing member is adapted and configured such that said flow directing member receives essentially all the gas flowing through the internal gaspath of the component.

3. The apparatus of claim 1 wherein said flow directing member is designed and adapted to be attached to at least one of the component or said housing.

4. The apparatus of claim 1 wherein each said cell has a cell flow area, the component is associated with a flow area of the internal gaspath, and each cell flow area is less than the gaspath flow area.

5. The apparatus of claim 1 wherein said flow directing member is located downstream from and spaced apart from the component such that gas exiting from the internal gaspath of the component entrains ambient air into said flow directing member.

6. The apparatus of claim 1 wherein the flow directing member includes a diverging nozzle.

7. The apparatus of claim 1 wherein the flow directing member includes a first ring of a first diameter and a second ring of a second diameter, the first diameter being greater than the second diameter, said first ring being concentric with said second ring, said first ring defining a boundary of a first annulus, said second ring defining a boundary of a second annulus, wherein a first portion of the air exiting from the component flows through the first annulus and a second portion of the air exiting from the component flows through the second annulus.

8. The apparatus of claim 1 wherein gas from said source flows generally in a direction toward the aperture, and the walls of each said cell are generally parallel to the direction.

9. The apparatus of claim 1 wherein the component has a centerline, and the walls of each said cell are generally parallel to the centerline.

10. The apparatus of claim 1 wherein said instrument is a flowmeter.

11. The apparatus of claim 1 wherein said instrument is a pressure gage.

12. The apparatus of claim 1 wherein said instrument is a flowmeter and the property is gas pressure.

13. The apparatus of claim 1 wherein the gas flowing through said flow directing member flows directly into about ambient conditions.

14. The apparatus of claim 1 wherein said flow directing member is a first flow directing member, and which further comprises a second flow directing member located upstream of the aperture for directing the gas from said source toward the component.

15. The apparatus of claim 14 wherein said second flow directing member includes a vane for changing the direction of gas flowing toward the component.

16. An apparatus for flow testing of gas through a component having an internal gaspath, comprising:
 a test bench including a source of flowing gas and a housing adapted and configured for mounting of the component;
 means for directing source gas toward the internal gaspath of the component, said source directing means including at least one internal vane for providing a predetermined velocity profile in the gas flowing into the internal gaspath of the component;
 means for directing gas exiting internal gaspath of the component, said exit gas directing means including at least one internal passageway for modifying the gas flowing from the internal gaspath of the component, said exit gas directing means being adapted and configured such that gas exiting from the internal gaspath of the component entrains ambient air into gas directing means; and
 an instrument for measuring a property of the flowing gas;
 wherein said housing is adapted and configured such that the internal gaspath of the component receives essentially all the gas flowing from said source gas directing means.

17. The apparatus of claim 16 which further comprises an electronic controller for controlling the source of gas.

18. The apparatus of claim 16 wherein said source gas directing means includes a plurality of passageways for making more uniform the properties of the gas from the source.

19. The apparatus of claim 16 wherein the passageways of said source gas directing means reduce the variation in the gas velocity profile proximate the entrance to the component.

20. The apparatus of claim 16 wherein said source of flowing gas is a motorized air blower located upstream of said source gas directing means, wherein the gas flowing through said exit gas directing means flows into about ambient conditions.

21. The apparatus of claim 16 which further comprises a gas flowmeter for measuring the quantity of gas flowing through said component.

22. The apparatus of claim 16 which further comprises a display for receiving a signal from said instrument and providing a visual response corresponding to the property measured by the instrument.

23. The apparatus of claim 16 wherein said exit gas directing means is adapted and configured such that said exit gas directing means receives essentially all the gas flowing through the internal gaspath of the component.

24. The apparatus of claim 16 wherein each said internal passageway has a passageway flow area, the component is associated with a flow area of the internal gaspath, and each passageway flow area is less than the gaspath flow area.

25. A method for evaluating a gasflow characteristic of an internal gaspath of a gaspath component for a gas turbine engine, comprising:
 providing a source of gas, a plenum chamber including a support member for supporting the component, and a gasflow directing member including a radially convoluted exit for exhausting of gas from said directing member;
 mounting the component with the support member;
 directing a steady flow of the gas from the source into the plenum chamber;
 flowing the gas from the chamber through the internal gaspath of the component;
 flowing the gas exiting the internal gaspath of the component into the gasflow directing member; and
 modifying the flow of gas through the internal gaspath of the component by the flow of gas through the gasflow directing member.

26. The method of claim 25 which further comprises calculating a flow characteristic of the component based on a measurement of the flow of the gas prior to said flowing the gas from the chamber through the internal gaspath of the component.

27. The method of claim 25 wherein said source of gas is a motorized air blower located upstream of the component, and wherein the gas exiting the gasflow directing member flows to approximately ambient pressure.

28. The method of claim 25 wherein the chamber includes an interior and an exterior, and said mounting is to the exterior.

29. A method for evaluating a gasflow characteristic of an internal gaspath of a gaspath component for a gas turbine engine, comprising:
 providing a source of gas, a plenum chamber including a support member for supporting the component, and a gasflow directing member;
 mounting the component with the support member;

placing the gas flow member aft of the support member such that there is a gap therebetween;

directing a steady flow of the gas from the source into the plenum chamber;

flowing gas from the chamber through the internal gaspath of the component;

flowing the gas exiting the internal gaspath of the component into the gasflow directing member;

entraining ambient air from the gap into the gasflow directing member by said flowing the exiting gas; and modifying the flow of gas through the internal gaspath of the component by said entraining.

30. The method of claim 29 wherein said flowing gas from the chamber is flowing essentially all of the gas from the chamber through the internal gaspath of the component.

31. An apparatus for flow testing of gas through a component having an internal gaspath, comprising:

a test bench including a source of flowing gas and a housing defining a plenum chamber and an aperture for flowing of the gas into the internal gaspath of the component, said housing being adapted and configured to mount the component proximate to the aperture;

a flow directing member located downstream of and proximate to the aperture, said flow directing member receiving gas from the internal gaspath of the component and exhausting the gas to about ambient conditions, said flow directing member including a plurality of open cells, each said cell having a plurality of walls for passage therebetween of a portion of the gas from the component;

an instrument which measures a property of the gas; and wherein said housing is adapted and configured such that the internal gaspath of the component receives essentially all the gas flowing through the aperture;

wherein the flow directing member includes a converging nozzle located on the aft end of said flow directing member.

32. An apparatus for flow testing of gas through a component having an internal gaspath, comprising:

a test bench including a source of flowing gas and a housing defining a plenum chamber and an aperture for flowing of the gas into the internal gaspath of the component, said housing being adapted and configured to mount the component proximate to the aperture;

a flow directing member located downstream of and proximate to the aperture, said flow directing member receiving gas from the internal gaspath of the component and exhausting the gas to about ambient conditions, said flow directing member including a plurality of open cells, each said cell having a plurality of walls for passage therebetween of a portion of the gas from the component;

an instrument which measures a property of the gas; and wherein said housing is adapted and configured such that the internal gaspath of the component receives essentially all the gas flowing through the aperture; and wherein the flow directing member includes a radially convoluted exit for exhausting of gas from said flow-directing member.

33. An apparatus for flow testing of gas through a component having an internal gaspath, comprising:

a test bench including a source of flowing gas and a housing defining a plenum chamber and an aperture for flowing of the gas into the internal gaspath of the component, said housing being adapted and configured to mount the component proximate to the aperture;

a flow directing member located downstream of and proximate to the aperture, said flow directing member receiving gas from the internal gaspath of the component and exhausting the gas to about ambient conditions, said flow directing member including a plurality of open cells, each said cell having a plurality of walls for passage therebetween of a portion of the gas from the component; and an instrument which measures a property of the gas;

wherein said flow directing member and component define a gap therebetween such that gas exiting from the component entrains ambient air through the gap prior to entering the flow directing member.

34. An apparatus for flow testing of gas through a component having an internal gaspath, comprising:

a test bench including a source of flowing gas and a housing defining a plenum chamber and an aperture for flowing of the gas into the internal gaspath of the component, said housing being adapted and configured to mount the component proximate to the aperture;

a flow directing member located downstream of and proximate to the aperture, said flow directing member receiving gas from the internal gaspath of the component and exhausting the gas to about ambient conditions, said flow directing member including a plurality of open cells, each said cell having a plurality of walls for passage therebetween of a portion of the gas from the component; and an instrument which measures a property of the gas;

wherein the flow directing member includes a converging nozzle located on the aft end of said flow directing member.

35. An apparatus for flow testing of gas through a component having an internal gaspath, comprising:

a test bench including a source of flowing gas and a housing defining a plenum chamber and an aperture for flowing of the gas into the internal gaspath of the component, said housing being adapted and configured to mount the component proximate to the aperture;

a flow directing member located downstream of and proximate to the aperture, said flow directing member receiving gas from the internal gaspath of the component and exhausting the gas to about ambient conditions, said flow directing member including a plurality of open cells, each said cell having a plurality of walls for passage therebetween of a portion of the gas from the component; and an instrument which measures a property of the gas;

wherein the flow directing member includes a radially convoluted exit for exhausting of gas from said flow-directing member.

36. An apparatus for flow testing of gas through a component having an internal gaspath, comprising:

a test bench including a source of flowing gas and a housing adapted and configured for mounting of the component;

means for directing source gas toward the internal gaspath of the component, said source directing means including at least one internal vane for providing a predetermined velocity profile in the gas flowing into the internal gaspath of the component;

means for directing gas exiting internal gaspath of the component, said exit gas directing means including at least one internal passageway for modifying the gas flowing from the internal gaspath of the component; and an instrument for measuring a property of the flowing gas;

wherein the flow directing member includes a radially convoluted exit for exhausting of gas from said flow-directing member.

* * * * *